Figure 1:
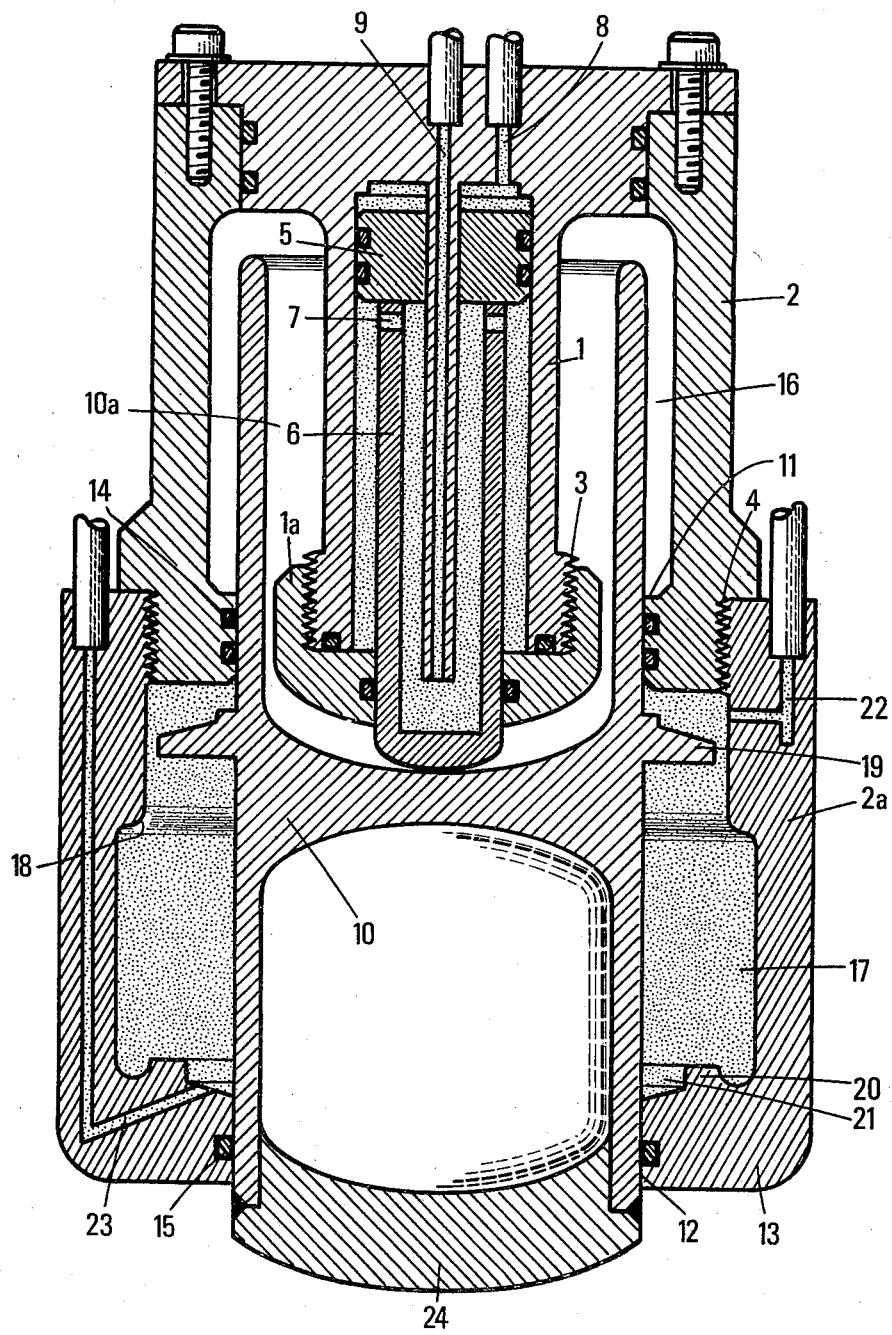

United States Patent [19]

Cholet

[11] 3,997,022

[45] Dec. 14, 1976

[54] DEVICE FOR GENERATING ACOUSTIC WAVES BY IMPLOSION

[75] Inventor: Jacques Cholet, Rueil Malmaison, France

[73] Assignee: Institut Francais du Petrole, des Carburants et Lubrifiants et Entreprise de Recherches et d'Activities Petrolieres Elf, France

[22] Filed: May 16, 1975

[21] Appl. No.: 578,183

[30] Foreign Application Priority Data

May 20, 1974 France .............................. 74.17775

[52] U.S. Cl. .............................. 181/120; 181/402; 181/119
[51] Int. Cl.² .......................................... G01V 1/02
[58] Field of Search ............................. 181/119, 120

[56] References Cited

UNITED STATES PATENTS

| | | | |
|---|---|---|---|
| 3,349,867 | 10/1967 | Mounce | 181/119 |
| 3,578,102 | 5/1971 | Ross et al. | 181/119 |
| 3,833,087 | 9/1974 | Cholet | 181/119 |

*Primary Examiner*—Leland A. Sebastian
*Attorney, Agent, or Firm*—Craig & Antonelli

[57] ABSTRACT

Device for generating acoustic waves in a fluid medium by implosion, comprising a main cylinder, a main piston slidably mounted thereinto, said piston having a hollow cylindrical portion housing another cylinder solid with the main one and, through the bottom of which passes the hollow rod of another piston, actuated by hydraulic means and which drives in translation the main piston. By means of an annular valve, solid with the main piston, and further hydraulic means, the main piston may be locked in a position of spaced relationship with respect to the main cylinder and abruptly unlocked, thereby generating an implosion.

17 Claims, 4 Drawing Figures

DEVICE FOR GENERATING ACOUSTIC WAVES BY IMPLOSION

This invention concerns a device for generating acoustic waves by implosion and, more particularly, for generating acoustic waves in a fluid.

The prior art, in this field, may be illustrated by a conventional device for generating acoustic waves whose operating principle consists of storing highly pressurized air in an appropriate submerged chamber and then very abruptly releasing said air into the surrounding water, thereby generating an acoustic wave. A device of this type is described in U.S. Pat. No. 3,249,177.

In this kind of device, the step of storing the air under very high pressure requires the use of very expensive compressors. Moreover, the power efficiency of such a device is not satisfactory and the pulsating signal obtained is not favorable to a proper use thereof, e.g. in seismic prospecting.

The present invention has for an object to provide a device for generating acoustic waves by implosions which may follow each other at a high rate, whereby a continuous survey of the subsoil may be achieved. This device is of small bulk and, accordingly, can be used in seismic prospecting in the sea at a great depth, since the surface withstanding the high pressures is small. It is also adapted to produce acoustic waves in bore holes.

The device of this invention essentially comprises a cylinder, a piston having a surface in contact with a fluid and slidably mounted in the cylinder while isolating the inside thereof from the fluid. It further comprises a movable member associated to actuating means for applying onto the piston an intermittent pressure and make it to slide up to a position of spaced relationship, and releasable locking means, separable from the movable member, for locking the piston in its position of spaced relationship and unlocking it substantially instantaneously.

Figure 2:
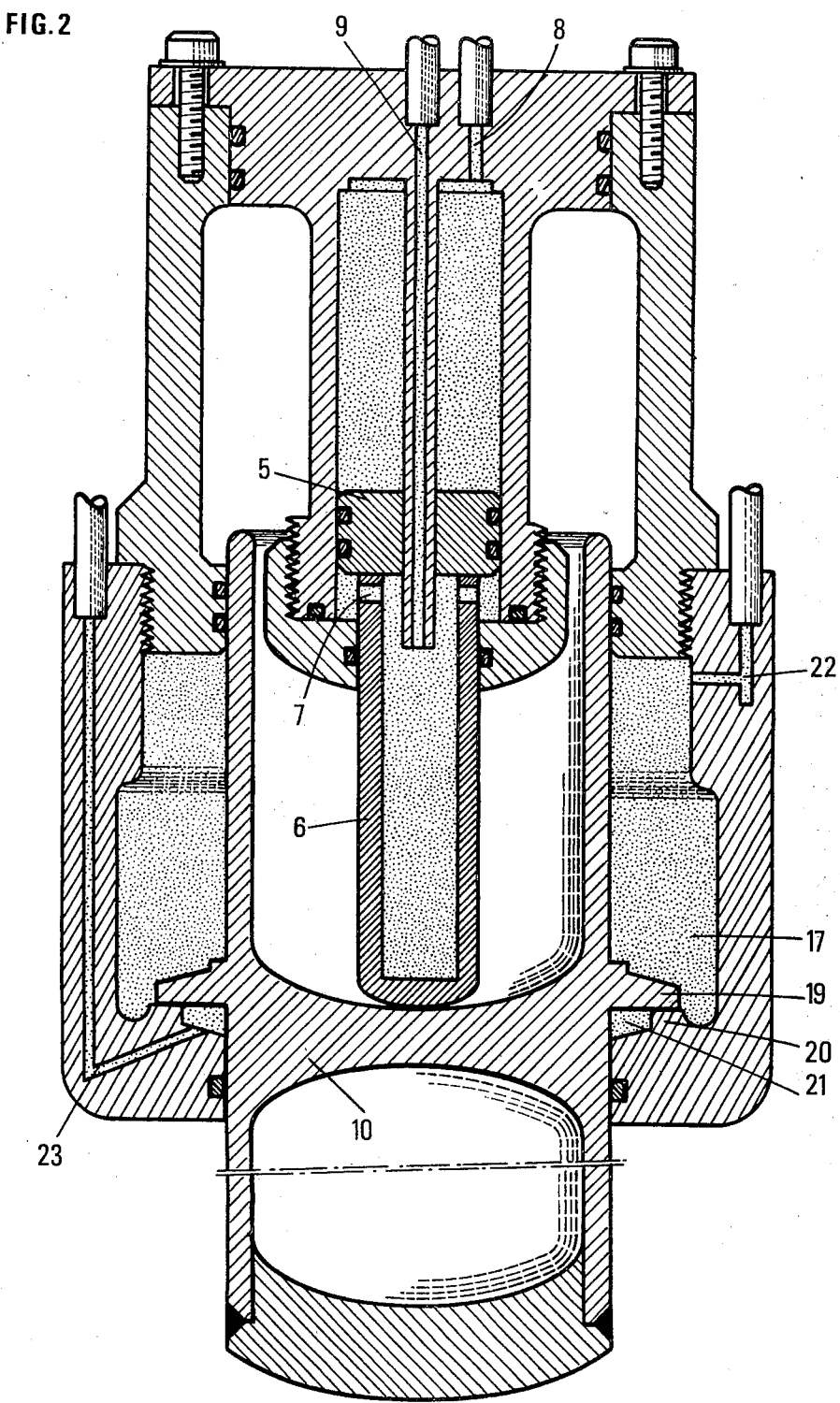
Figure 3:
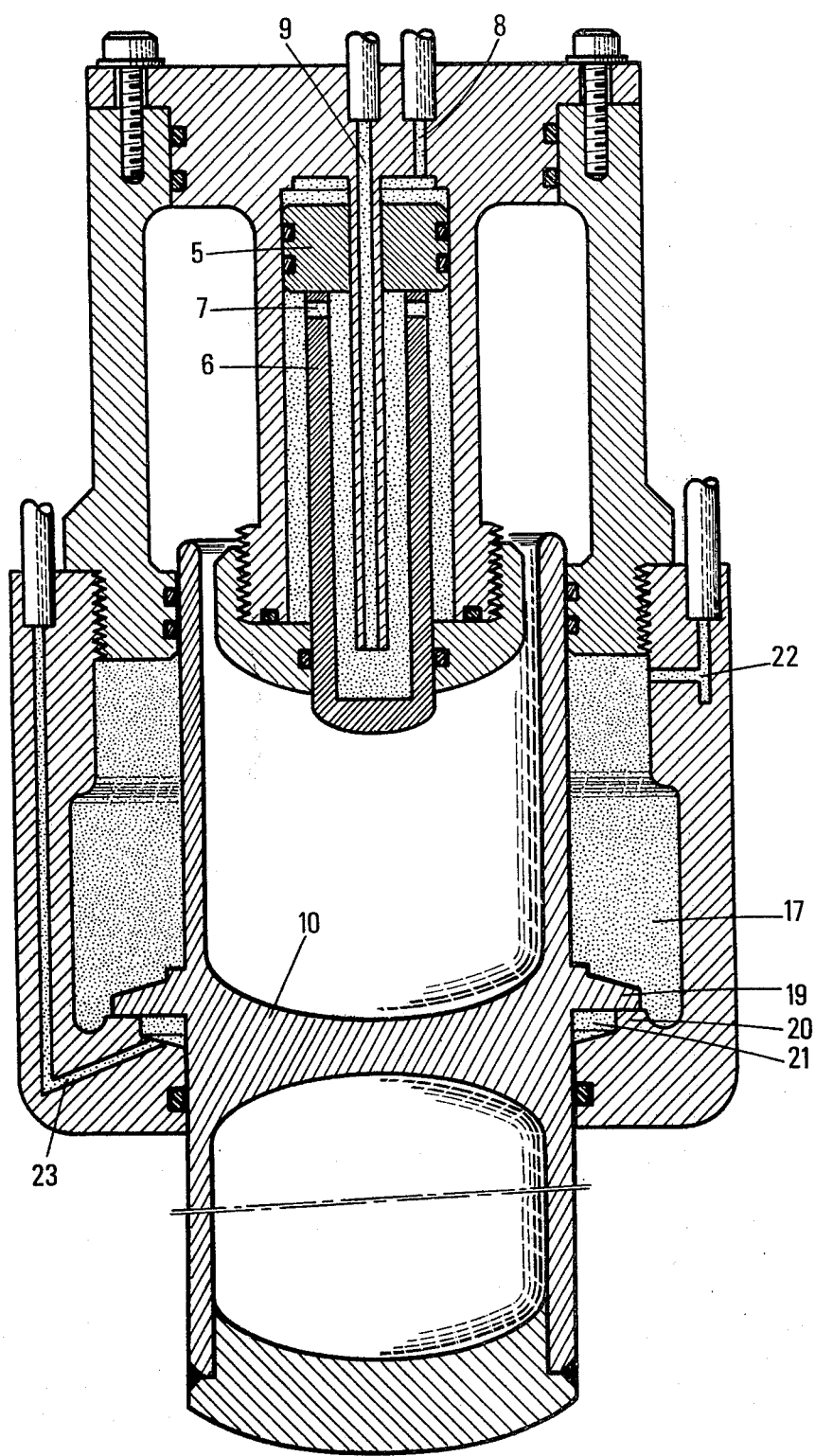
Figure 4:
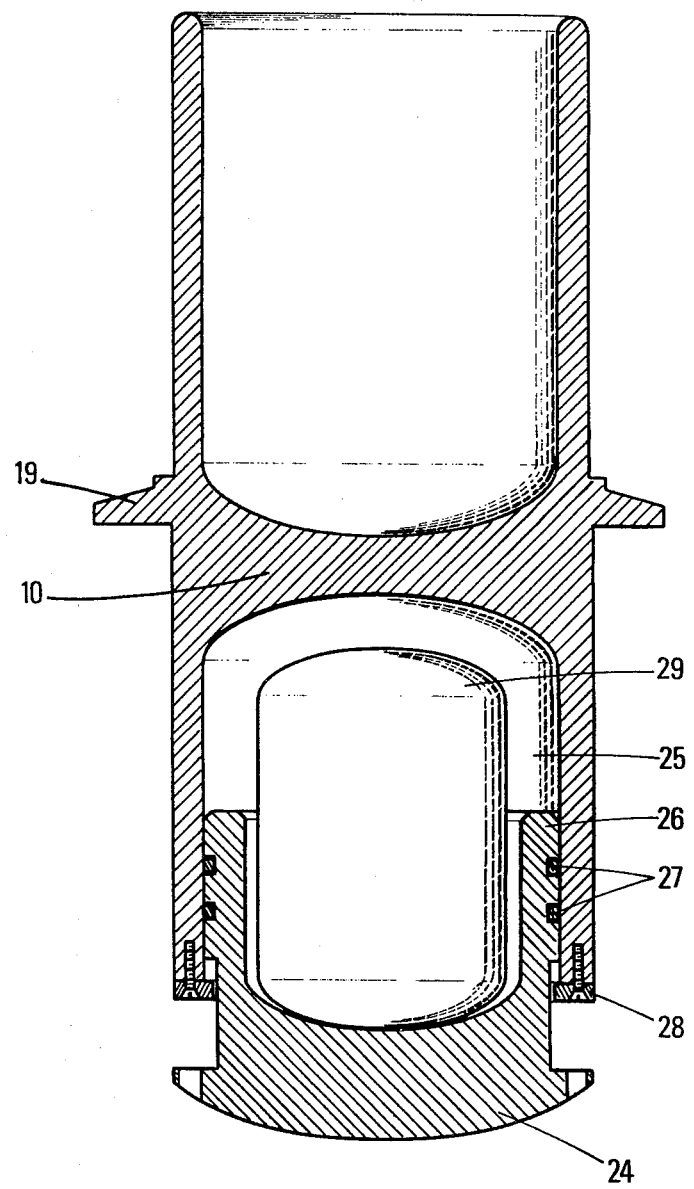

The operation of the device will be further described in detail with reference to the accompanying drawings in which:

FIG. 1 diagrammatically shows a cross-section of device, the cylinder and the piston being in the position where they are close to each other, FIG. 2 diagrammatically shows a cut of the device, the cylinder and the piston being in spaced relationship maintained by the movable member, FIG. 3 diagrammatically shows a cross-sectional view of the device, the cylinder and the piston being in spacedapart relationship and locked in that position, and FIG. 4 shows an embodiment of the piston.

According to these figures, the device essentially comprises a first cylinder 1, solid with a second cylinder 2. Cylinders 1 and 2 may for simplicity of their assembly, consist each of two portions respectively 1 and 1a and 2 and 2a, secured to each other, for example by threads, respectively 3 and 4.

A first piston 5, provided with a hollow rod 6, is adapted to slide in the first cylinder, the rod 6 passing through the bottom 1a of said cylinder. The inside of the first cylinder 1, as well as the hollow rod 6 with which it communicates through orifices 7 are fed, through pipes 8 and 9, with oil supplied from a distribution system of a known type, not shown.

A second piston 10 is adapted to slide into the second cylinder 2, 2a. This piston comprises a cylindrical recess 10a, open at one end and whose internal diameter is greater than the external diameter of cylinder 1, 1a. The second piston is guided in its motion by a shoulder 11, inside the second cylinder and by a bore 12, passing through the end face 13 opposite to that facing the recess 10a of said second piston. Sealing joints 14 and 15 are inserted into the internal wall of shoulder 11 and of the bore 12.

Shoulder 11, piston 10 and joints 14 divide the second cylinder 2 into two cavities 16 and 17, cavity 16 being on the side of the first cylinder 1. A pressure much lower than the external pressure is generated in the tight volume defined by cavity 16 and recess 10a. The second cavity 17 comprises two portions of different sections, joined with a shoulder 18. The portion of smaller section is on the side of shoulder 11. The portion of the second piston 10 contained in cavity 17, is provided with an annular protrusion 19 of a diameter greater than that of piston 10 and slightly smaller than that of the narrower portion of cavity 17.

The end wall 13 of the second cylinder is provided, on the inner side thereof, with an annular seat 20 of a diameter smaller than that of the larger section of cavity 17. The seat 20 defines an inner recess 21. Cavity 17 is fed, through two pipes 22 and 23, with oil supplied from a distribution system of a known type, not shown. Pipe 23 opens into the recess 21 formed inside the seat 20.

The operation of the device is as follows:

In a first step, the device is in the position shown in FIG. 1. The second piston 10 is in the position of maximum penetration inside the second cylinder 2. The first piston 5 is also in position of maximum penetration inside the first cylinder 1.

The distribution system is actuated so as to inject pressurized oil into cylinder 1 on the side of the first piston opposite to the rod 6.

The oil injection drives off the first piston 5 and rod 6 solid therewith comes in abutment against the bottom of the open cylindrical portion 10a of the second piston. The latter slides to a position shown in FIG. 2 in which the protruding annular valve 19 abuts against the seat 20. Recess 21, inside the seat 20, is thus separated from cavity 17. The distribution system is then actuated so as to establish atmospheric pressure in recess 21 through pipe 23.

Simultaneously, by actuating the distribution system, pressurized oil is injected through pipe 22 into cavity 17 which was previously filled with low pressure oil. The push exerted on the protruding annular valve 19 maintains it in abutment against the seat 20 and locks the second piston 10 in its position.

Subsequently, pressurized oil is injected through pipe 9 inside rod 6 of the first piston 5 communicating with the inside of the first cylinder 1 through orifices 7. As a result of this injection, the first piston penetrates into the first cylinder 1 up to the position shown in FIG. 3. The device is then ready for actuation.

At the time selected for starting the actuation, pressurized oil is injected through pipe 23. The oil exerts a push on the surface of the protruding annular valve 19 and releases the seat 20. At this moment, the same pressure prevails on both sides of valve 19.

When the device is submerged in water, the second piston 10 is subjected to two complementary forces: the hydrostatic force applying on the external end wall 24 of said piston and the force resulting from the additional negative pressure generated, in the tight volume defined by cavity 16 and recess 10a, by the disengagement of said piston.

The second piston 10, abruptly penetrates inside the second cylinder up to the position shown in FIG. 1. Acoustic waves are generated by the rapid volume variation of the submerged device and its stopping at the end of its stroke. A too abrupt stopping is avoided by shearing of the oil through the passage between the annular valve 19 and the shoulder 18, which results in a dampening of the penetration of piston 10 into the second cylinder.

The device is now again in its initial position (FIG. 1) and a new cycle may be performed.

In the embodiment illustrated in FIG. 4, piston 10 has a second cavity 25, on the side opposite to the first cavity 10a, housing a slidable third piston 26 whose end wall 24 forms a head. Sealing joints 27 isolate the interior of cavity 25 from the external medium. A stop ring 28 limits the stroke of said third piston when moving outwards.

A dampening device 29 of any type, e.g. a block of elastic material, is interposed between the third piston 26 and the bottom of cavity 25. The length and the stiffness of said dampener are chosen so as to maintain a certain stroke of penetration of the third piston inside cavity 25, at the water depth at which the device is used.

By this way the stroke of water against the end wall 24, when piston 10 reaches the end of its stroke, may be dampened.

Surface 24 may thus better withstand the repeated stresses applied thereto.

I claim:

1. A device for generating acoustic waves in a fluid medium by implosion comprising a cylinder; a piston having a wall in contact with the fluid medium and adapted to slide in said cylinder between a first inner position in said cylinder and a second outer position in said cylinder, said piston permanently sealing the inside of said cylinder from said fluid medium; a movable member intermittently abutting against said piston for driving the same in only a first direction; means for successively driving said movable member in said first direction such that said piston is moved toward said second position, and driving said movable member in an opposite direction toward said first position; releasable means for releasably locking said piston in said second position; and means for abruptly returning said piston to said first position.

2. A device according to claim 1, wherein said means for abruptly returning said piston to said first position comprises means for tightly isolating a chamber defined by an internal portion of said cylinder and an internal recess of said piston.

3. A device for generating acoustic waves in a fluid medium by implosion comprising a first cylinder; a first piston having a wall in contact with the fluid medium and adapted to slide in said first cylinder between a first inner position in said first cylinder and a second outer position in said first cylinder, said piston permanently sealing the inside of said first cylinder from said fluid medium; a second piston adapted to slide into a second cylinder solid with said first cylinder, said second piston intermittently abutting against said first piston for driving the same in only a first direction; means for successively driving said second piston in said first direction such that said first piston is moved toward said second position, and driving said second piston in an opposite direction toward said first position; releasable means for releasably locking said first piston in said second position; and means for abruptly returning said first piston to said first position.

4. A device according to claim 3, wherein said means for abruptly returning said first piston to said first position comprises means for tightly isolating a chamber defined by an internal portion of said first cylinder and an internal recess of said first piston.

5. A device according to claim 4, wherein said internal recess is adapted to contain at least a portion of said second cylinder.

6. A device for generating acoustic waves in a fluid medium by implosion comprising a cylinder; a piston having a wall in contact with the fluid medium and adapted to slide in said cylinder between a first inner position in said cylinder and a second outer position in said cylinder, said piston permanently sealing the inside of said cylinder from said fluid medium; a movable member for intermittently abutting against said piston for driving the same in only a first direction; means for successively driving said movable member in said first direction such that said piston is moved toward said second position, and driving said movable member in an opposite direction toward said first position; valve means solid with said piston; pressure means for maintaining said valve means in abutment against an inner surface of said cylinder in said second position of said piston; releasable means for releasably locking said piston in said second position; and means for abruptly returning said piston to said first position.

7. A device according to claim 6, wherein said means for abruptly returning said piston to said first position comprises means for tightly isolating a chamber defined by an internal portion of said cylinder and an internal recess of said piston.

8. A device according to claim 6, wherein said pressure means comprises a fluid system for providing a liquid under pressure inside a cavity containing said valve means.

9. A device according to claim 8, wherein said inner surface of said cylinder is an end wall of said cylinder provided with a stop member for said piston in said second position and forming a valve seat for said valve means.

10. A device according to claim 9, wherein said valve seat includes an inner recess communicating with said fluid system.

11. A device according to claim 8, wherein said cylinder is provided with a lateral inner wall in said cavity having a narrow section which is slightly larger than the section of said valve means on said piston opposite to said end wall, said narrow section dampening the movement of said piston by shearing of said liquid under pressure in said cavity by said valve means.

12. A device according to claim 6, wherein said movable member includes a second piston adapted to slide within a second cylinder solid with said cylinder, said second cylinder and said second piston being contained at least partially within an internal recess of said piston.

13. A device for generating acoustic waves in a fluid medium by implosion comprising a cylinder; a piston having a wall in contact with the fluid medium and adapted to slide in said cylinder between a first inner position in said cylinder and a second outer position in said cylinder, said piston permanently sealing the inside of said cylinder from said fluid medium, and said wall of said piston in contact with the fluid medium being displaceable with respect to said piston; a movable member for intermittently abutting against said piston for driving the same in only a first direction; means for successively driving said movable member in said first direction such that said piston is moved toward said second position, and driving said movable member in an opposite direction toward said first position; means for releasably locking said piston in said second position; and means for abruptly returning said piston to said first position.

14. A device according to claim 13, wherein said means for successively driving said movable member comprises another cylinder solid with said cylinder and another piston adapted to slide into said another cylinder and intermittently abutting against said piston.

15. A device according to claim 14, wherein said locking means comprises valve means solid with said piston, and pressure means for maintaining said valve means in abutment against an inner surface of said cylinder in said second position of said piston.

16. A device according to claim 15, wherein said displaceable wall of said piston cooperates with dampening means for exerting a counter-pressure on said wall.

17. A device for generating acoustic waves in a fluid medium by implosion comprising
a hollow cylindrical member having a first closed end and a second open end;
a piston having an end portion in contact with the fluid medium, and slidable within said hollow cylindrical member through said second open end, said piston maintaining a permanent seal between the interior of said hollow cylindrical member and said fluid medium;
means for moving said piston within said hollow cylindrical member against said fluid medium from a first position to a second position to create a negative pressure within said hollow cylindrical medium; and
means for releasing said piston from said second position such that said piston abruptly moves from said second position to said first position under the combined action of said negative pressure and the pressure of said fluid medium on said end portion of said piston to generate acoustic waves in said fluid medium by implosion.

* * * * *

UNITED STATES PATENT OFFICE
CERTIFICATE OF CORRECTION

Patent No. 3,997,022     Dated December 14, 1976

Inventor(s) Jacques Cholet

It is certified that error appears in the above-identified patent and that said Letters Patent are hereby corrected as shown below:

Title Page as it now reads:

"[73] Assignee: Institut Francais du Petrole, des Carburants et Lubrifiants et Entreprise de Recherches et d'Activities Petrolieres Elf, France"

Title Page as it should read:

--[73] Assignee: Institut Francais du Petrole, France--

Signed and Sealed this

Nineteenth Day of April 1977

[SEAL]

Attest:

RUTH C. MASON
*Attesting Officer*

C. MARSHALL DANN
*Commissioner of Patents and Trademarks*